Jan. 1, 1929.  W. FLAMM  1,697,525
ONION TOPPER
Filed Aug. 6, 1927
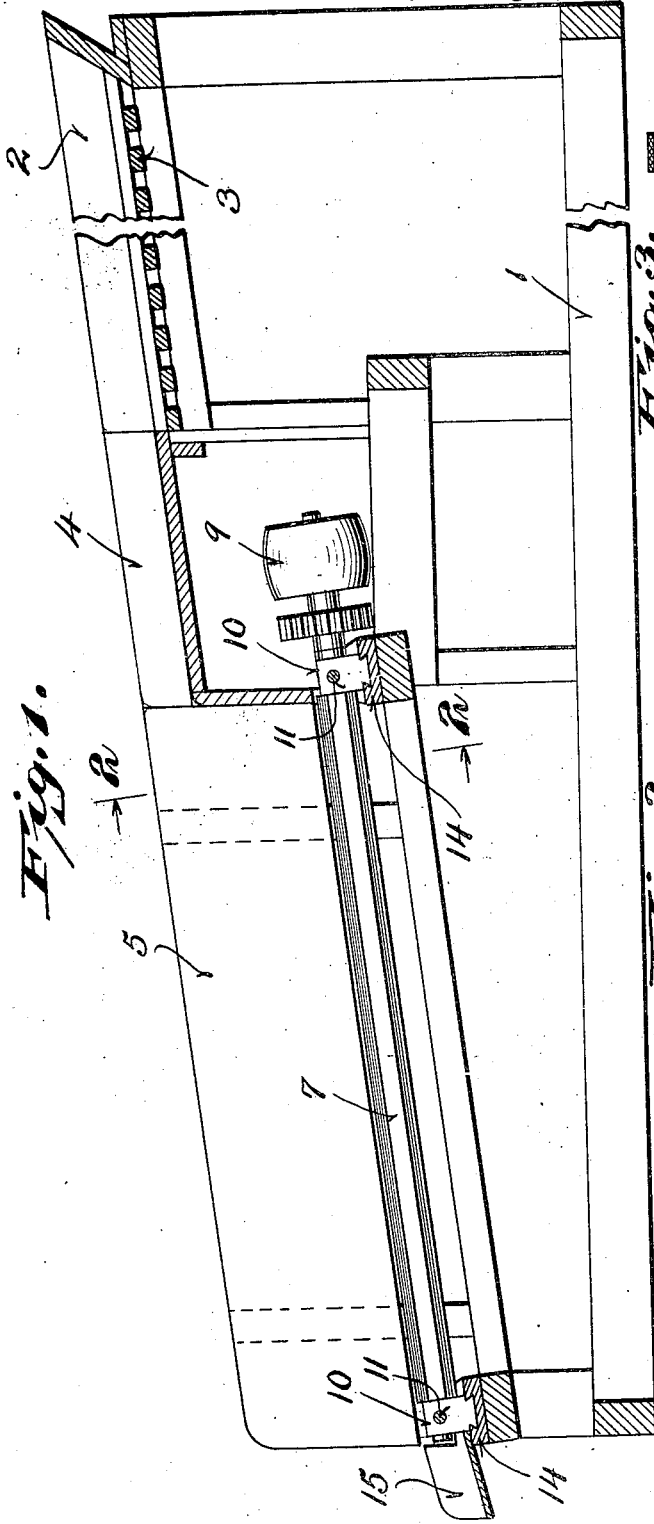
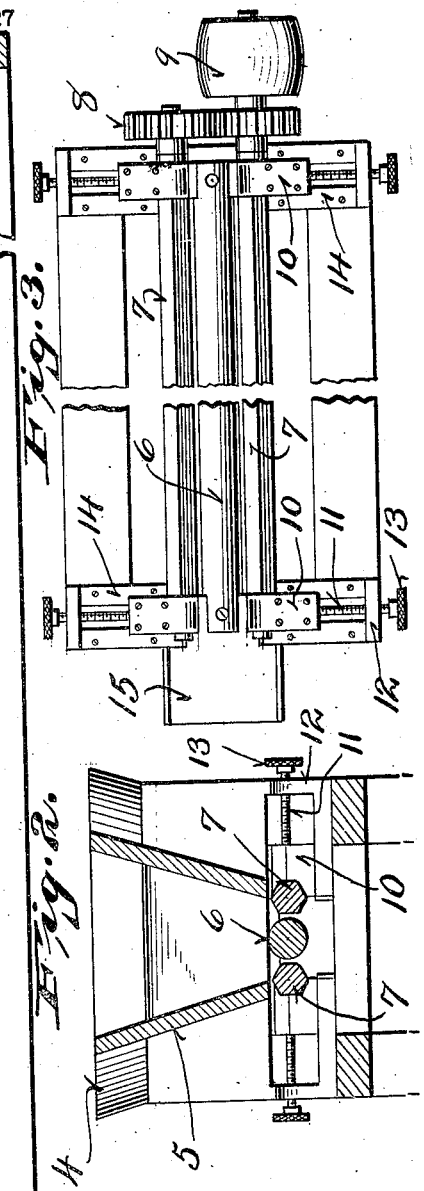
Inventor
W. Flamm
By Young & Young
Attorneys Patented Jan. 1, 1929.

1,697,525

UNITED STATES PATENT OFFICE.

WILLIAM FLAMM, OF MILWAUKEE, WISCONSIN.

ONION TOPPER.

Application filed August 6, 1927. Serial No. 211,228.

This invention relates to onion toppers.

Objects of this invention are to provide an onion topping machine which will handle the easily damaged onions without injury and which will cut the tops off close to the body of the onions in a highly efficient and rapid manner.

Further objects are to provide an onion topping machine which will operate upon any size of onions even the very small onions used for setting out or for seed purposes.

Further objects are to provide an onion topping machine which will permit the discharge of dirt from the hopper, which is provided with a throat leading from the hopper along which the attendant may pass the onions, and which is provided with a stationary member and with rotary members provided with sharp edges which cooperate with the stationary member to cut the tops from the onions, and to further provide means for adjusting the rotary members as wear occurs.

An embodiment of the invention is shown in the accompanying drawings in which:

Figure 1 is a longitudinal sectional view through the machine;

Figure 2 is a sectional view on the line 2—2 of Figure 1;

Figure 3 is a plan view of a portion of the machine.

Referring to the drawings, it will be seen that the machine is carried by a suitable base 1 which is provided with uprights which carry the essential parts of the apparatus. A hopper 2 is provided with a slatted bottom 3 through which dirt clinging to the onions may fall. This hopper leads to a converging throat 4, as shown in Figures 1 and 2. It is to be noted that the hopper 2 is made up of longitudinal and transverse slats with the longitudinal slats uppermost.

The converging throat discharges between a pair of downwardly converging guiding plates 5, as shown in Figures 1 and 2.

The machine is provided with a stationary member 6, preferably of cylindrical contour, and with a pair of polygonal rolls 7 which have sharp edges cooperating with the stationary member to cut the tops from the onions. The rolls 7 are provided with intermeshing gears 8 and one of the rolls is driven by means of a pulley 9, so that they will simultaneously rotate towards the stationary member 6 and thus cut the tops of the onions from the body. The rolls are journaled in movable cross heads or journal members 10. These members 10 are provided with screws 11 threaded into the side ears 12, as shown in Figure 2, and provided with knurled adjusting hand wheels 13. The journalled members or cross heads 10 have dovetailed lower portions which fit corresponding guides 14 (see Figures 1 and 3).

The lower portion of the machine is open and is adapted to permit the free discharge of the onion tops.

It is to be noted that the rolls and the stationary member slant downwardly from the hopper and that a discharge chute 15 is provided at the rear end of the machine for the topped onions.

In operation, the onions are dumped into the hopper and any dirt clinging thereto falls through the bottom of the hopper. The attendant pushes the onions along the converging throat 4 so that they fall onto the rapidly rotating rolls and the stationary member. The tops are cut off by the rotating rolls and the onions travel down the slanting stationary member and rolls and are discharged from the spout 15.

From actual tests conducted with this machine, it has been found that it rapidly tops onions of any size even the very small onions used for planting purposes.

It has been found further that the onions are not damaged in any manner by this machine.

Although the invention has been described in considerable detail, such description is intended as illustrative rather than limiting as the invention may be variously embodied and as the scope of such invention is to be determined as claimed.

I claim:

An onion topping machine comprising a stationary cylinder and a polygonal roll located on each side of said stationary cylinder, said rolls and said cylinder slanting downwardly towards one end, and means for rotating said rolls with their upper surfaces travelling towards said cylinder, whereby the onions will be topped by the cooperation of the edges of the polygonal rolls and the cylinder and will travel downwardly and pass from the lower ends of said rolls and cylinder.

In testimony that I claim the foregoing I have hereunto set my hand at Milwaukee, in the county of Milwaukee and State of Wisconsin.

WILLIAM FLAMM.